Figure 1:
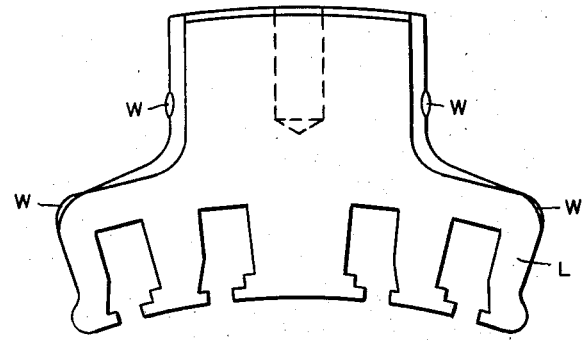

April 7, 1959  R. A. TARLTON  2,880,498
LAMINATED MAGNETIC STACK
Filed Nov. 30, 1953

WITNESSES:
E. A. McCloskey
Wm. B. Sellers

INVENTOR
Russell A. Tarlton.
BY
ATTORNEY

United States Patent Office 2,880,498
Patented Apr. 7, 1959

2,880,498

LAMINATED MAGNETIC STACK

Russell A. Tarlton, Kenton, Ohio, assignor to Westinghouse Electric Corporation, East Pittsburgh, Pa., a corporation of Pennsylvania Application November 30, 1953, Serial No. 395,057

1 Claim. (Cl. 29—196.1)

My invention relates to welding and has particular relation to the arc welding of silicon steel.

steel parts composed of a number of units welded together.

A more specific object of my invention is to eliminate the cracks and the porosity in the welds of laminated silicon steel poles, the laminations of which are edge welded together.

In its broader aspects, my invention arises from the discovery that the cracks in the welds depend on the ratio of the silicon content to the manganese content in the silicon steel. I have found that where this ratio is 5.2, or greater, cracks tend to develop. That the ratio is frequently 5.2 or greater can be seen from the following table which shows the composition of a number of heats of 9126 silicon steel and results obtained welding samples of such steel in accordance with the teachings of the prior art.

| Company | Heat | Analysis | | | | | | | | Ratio, Si to Mn | Gas, c.f.h. | Electrode | Current | Arc volts | Speed, i.p.m. | Remarks—welding conditions and behavior |
|---|---|---|---|---|---|---|---|---|---|---|---|---|---|---|---|---|
| | | C | Mn | P | S | Si | Ni | Sn | Cu | | | | | | | |
| Republic | 38176 | .04 | .21 | .022 | .025 | 1.36 | .040 | .011 | .08 | 6.4 | He, 25 | Tung., ⅛". | 180 | 22 | 40 | Good, all elements. |
| Do | 31337 | .04 | .27 | .017 | .034 | 1.39 | .029 | .007 | .08 | 5.14 | He, 25 | ---do------ | 180 | 22 | 40 | 49 welds, very good, all elements. |
| Do | 38081 | .04 | .22 | .016 | .039 | 1.56 | .030 | .007 | .05 | 7.09 | He, 25 | ---do------ | 180 | 22 | 40 | A number of cracks, bad. |
| Do | { 35375 | .04 | .21 | .012 | .033 | 1.34 | .033 | .019 | .12 | 6.3 | }He, 25 | ---do------ | 180 | 22 | 40 | 2 cracks, some porosity. |
| | { 31298 | .04 | .21 | .016 | .032 | 1.34 | .045 | .007 | .05 | 6.3 | | | | | | |
| Do | 33874 | .04 | .15 | .014 | .036 | 1.36 | .049 | .030 | .08 | 9.6 | He, 25 | ---do------ | 180 | 22 | 40 | Material half and half, cracked both sides. |
| Armco | 5663 | .036 | .26 | .080 | .031 | 1.39 | | | | 5.3 | He, 25 | ---do------ | 180 | 22 | 40 | Unusual arc condition in very long arc ionization potential not same as on other materials. |
| Do | 2459 | .032 | .22 | .078 | .027 | 1.39 | | | | 6.2 | He, 25 | ---do------ | 180 | 22 | 35 | Some gas pockets, slower speed helps. |
| Do | 6856 | .030 | .25 | .075 | .029 | 1.50 | | | | 6.0 | He, 25 | ---do------ | 180 | 22 | 35 | A little gas and approximately 2 cracks. |
| Do | 2470 | .037 | .23 | .068 | .025 | 1.42 | | | | 6.1 | He, 25 | ---do------ | 180 | 21 | 40 | Some porosity at end of weld, other functions normal. |
| Do | 4995 | .034 | .21 | .065 | .028 | 1.44 | | | | 6.8 | He, 25 | ---do------ | 180 | (¹) | 40 | Welding good, some contamination, red lines on 19 volt arc. |
| Do | 5609 | .039 | .26 | .080 | .030 | 1.40 | | | | 5.3 | He, 25 | ---do------ | 180 | 22 | 40 | Welds good except for a few cracks, probably due to poor shearing and notching. |
| U.S. Steel | 06Z469 | .03 | .33 | .005 | .027 | 1.50 | .09 | | .09 | 4.5 | He, 25 | ---do------ | 210 | 22 | 40 | This material required higher current, some undercutting that follows one punching through several welds. |
| Do | 07Z422 | .04 | .39 | .004 | .022 | 1.80 | .04 | | .09 | 4.0 | He, 25 | ---do------ | 210 | 22 | 40 | Welds look very good except for slight undercutting. |
| Do | 06Z410 | .04 | .39 | .006 | .024 | 1.78 | | | .12 | 4.5 | He, 25 | ---do------ | 210 | 22 | 40 | Welds very good, undercut on one or two strips, these strips appear darker. |
| Do | 06Z370 | .04 | .38 | .003 | .027 | 1.70 | | | .07 | 4.4 | He, 25 | ---do------ | 210 | 22 | 40 | Welds very good, appearance good. |
| Do | 01Z400 | .04 | .35 | .005 | .021 | 1.62 | | | .07 | 4.6 | He, 25 | ---do------ | 210 | 22 | 40 | Do. |

¹ 22 and 19 as marked.

The silicon steel with which my invention is particularly concerned is steel of the type having magnetic properties which renders it particularly suitable for poles or other magnetic structures, for motors and generators. It is desirable for the purpose of reducing eddy current and sometimes from an economy standpoint to make up such poles from silicon steel laminates edge welded together. The edge welding is carried out by arc welding with a bare consumable electrode or with a non-consumable tungsten electrode in an inert gas atmosphere or in an atmosphere of inert gas including oxygen or with flux coated welding electrodes.

In making such edge-welded laminated poles, difficulty has been encountered. It has been found that in a relatively large proportion of the poles the welds are porous and have cracks.

It is accordingly broadly an object of my invention to eliminate the cracking and porosity in the welds of silicon In the table the manufacturer of the steel is shown in the left-hand column, the heat number in the next column, the analyses for carbon, manganese, phosphorus, sulphur, silver, nickel and copper in the next eight columns. The ratio of the silicon to the manganese is shown in the tenth column. Then follow five columns showing the parameters or conditions under which the welding of the steel was carried out. The extreme column on the right presents the results obtained in the welding samples of the various heats. As can be seen, difficulty was encountered in the welding of the Republic and Armco steels in which the ratio of the silicon to manganese was 5.2 or greater, while the welds produced with the Republic steel having a ratio of 5.14 and the United States Steel Corporation steel, which has a ratio of the silicon to the manganese of less than 5.2, were on the whole sound.

It appears desirable then that the ratio of the silicon to the manganese in the silicon steel be maintained at less than 5.2. I have found, however, that the ratio of the silicon to the manganese has an important bearing on the electrical and magnetic properties of the alloy and because of this the ratio should be as high as practicable.

It is accordingly a specific object of my invention to provide assemblies of silicon steel made up of units welded together which shall have good electrical and magnetic properties and in which the welds shall be sound.

An incidental object of my invention is to provide a laminated pole made of silicon steel, the laminations of which are welded together, which shall have desirable electrical and magnetic properties, and the welds of which shall be sound.

In its specific aspects, my invention arises from the discovery that cracks and porosity may be eliminated in the welding of silicon steel in which the silicon to manganese ratio is 5.2 or more by adding ferromanganese to the region in which the welds are being made either before or during the welding operation. I have further found that the addition of the ferromanganese does not eliminate cracks and porosity where the silicon content exceeds of the order of six percent, for example between 5 and 6%.

In accordance with my invention, I provide a method of welding of silicon steel having a ratio of the silicon to the manganese of 5.2 or more in the practice of which ferromanganese is added to the molten pool, either before or during the welding operation. I have found that this method uniformly produces crack-free and porosity-free welds in silicon steel except in cases in which the silicon content is excessively high. In accordance with a further specific aspect of my invention, I have provided a novel welded assembly, such as a magnetic pole or the like which has desirable electric and magnetic properties, and the welds of which are free of cracks and porosity. This assembly is characterized by the fact that in the assembly as a whole the ratio of the silicon to the manganese content is 5.2 or greater, while in the weld which constitutes only a small portion of the volume of the assembly, this ratio is less.

Figure 2:
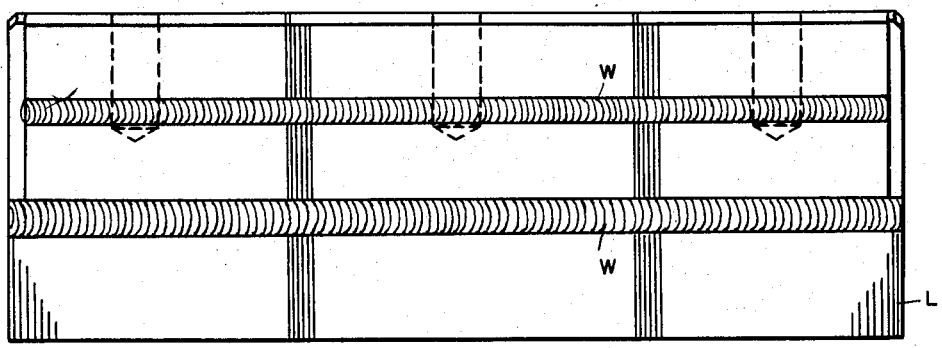

The novel features that I consider characteristic of my invention have been discussed generally above. The invention itself, both as to its organization and its method of operation together with additional objects and advantages thereof, will be understood from the following description of a specific embodiment when read in connection with the accompanying drawing, in which:

Fig. 1 is a view in end elevation of a pole piece in accordance with my invention; and Fig. 2 is a side view of the pole shown in Fig. 1.

The pole shown in the drawing is made up of a plurality of laminations L of silicon steel having a ratio of the silicon to the manganese content of 5.2 or more. Preferably, the silicon content should not be excessive; it should not exceed of the order of 5% or 6%. The laminations L are welded together by welds W along the two regions on both sides of the long sides of the poles. These welds are preferably produced by arc welding, either with a tungsten electrode in an inert gas with or without a small quantity of oxygen or with a consumable electrode composed of silicon steel, for example, in an inert gas of the same type or with a consumable electrode by the submerged arc process. Regardless of the method adopted for joining the laminations into a single pole, ferromanganese is added to the weld in such quantity that the ratio of the silicon to the manganese in the small areas of the welds is less than 5.2. I have found that the addition of the ferromangnese assures that sound welds, free of cracks and porosity, are produced.

The ferromanganese may be brushed on the region of the weld before the welding operation. If this practice is adopted, the ferromanganese is granulated and formed into a slip or a sticky mass of low viscosity with a wetting agent, such as water. This slip is then applied to the region to be welded with a suitable brush. The ferromanganese may also be granulated and then sprinkled on the region of the weld before the welding operation is carried out. I have found that porosity in the welds is substantially eliminated by this sprinkling method, even when the welds are produced in the poles at the rate of 40 inches per minute.

In accordance with my invention, the ferro-manganese may also be applied while welding. For this mode of application, the welding head should be provided with an opening in the region of the electrode holder through which the ferromanganese in granulated form may be projected. Alternatively, the ferromanganese may be projected by compressed air through a tube held adjacent to the welding electrode.

In accordance with my invention, I have provided a method of welding silicon steel having a ratio of silicon to manganese content of 5.2 or more and preferably having a silicon content of less than of the order of 6%. When this method is practiced, welds free of cracks and porosity are produced. The method has proved successful in welding punchings of #1550 silicon steel and #9126 silicon steel into pole pieces.

In accordance with my invention, I have also provided a welded article of manufacture, such as a pole piece composed of units joined together by welding each unit, being composed of silicon steel having a ratio of the silicon to the manganese content of 5.2 or more, and the welds joining the units together having a ratio of the silicon to the manganese of less than 5.2. This article has highly desirable electrical and magnetic properties since the ratio of the silicon to the manganese content is high except in the very small areas of the welds.

While I have shown and described a certain specific embodiment of my invention, many modifications thereof are possible. My invention, therefore, is not to be restricted except insofar as is necessitated by the spirit of the prior art.

I claim as my invention:

As an article of manufacture, a welded magnetic stack made of a number of laminations of silicon steel joined by a weld along the edges of the laminations extending over only a small region of each of said laminations, each lamination when in its original unwelded condition comprising an alloy consisting essentially of between .03% and .04% carbon, between .15% and .39% manganese, between 1.34% and 1.80% silicon, no more of such minor components as nickel, tin and copper than .09% and .030% and .12%, respectively, incidental impurities, and the remainder iron, said alloy having a ratio of the silicon to the manganese of 5.2 or more, the said article being characterized by the fact that the weld joining said units is composed of silicon steel having a ratio of silicon to manganese less than 5.2.

References Cited in the file of this patent
UNITED STATES PATENTS

| | | |
|---|---|---|
| 1,544,422 | Becket | June 30, 1925 |
| 1,595,143 | Doan | Aug. 10, 1926 |
| 1,671,384 | Stoody | May 29, 1928 |
| 1,671,417 | Franks | May 29, 1928 |
| 1,861,568 | Hodson | June 7, 1932 |
| 1,921,528 | Keir | Apr. 8, 1933 |
| 1,978,316 | Miller | Oct. 23, 1934 |
| 2,200,737 | Clapp | May 14, 1940 |
| 2,396,704 | Kerr | Mar. 19, 1946 |
| 2,448,785 | Dolan | Sept. 7, 1948 |
| 2,481,385 | Bloom | Sept. 6, 1949 |
| 2,537,207 | Carlson | Jan. 9, 1951 |
| 2,664,622 | Spitz | Jan. 5, 1954 |
| 2,769,227 | Sykes | Nov. 6, 1956 |